United States Patent
Tran et al.

(10) Patent No.: US 11,632,739 B1
(45) Date of Patent: Apr. 18, 2023

(54) FOCUSED CELLULAR NETWORK PAGING

(71) Applicant: T-Mobile USA, Inc., Bellevue, WA (US)

(72) Inventors: Antoine T. Tran, Bellevue, WA (US); Emile Tran, Sammamish, WA (US); Julio Costa, Tampa, FL (US)

(73) Assignee: T-Mobile USA, Inc., Bellevue, WA (US)

(*) Notice: Subject to any disclaimer, the term of this patent is extended or adjusted under 35 U.S.C. 154(b) by 84 days.

(21) Appl. No.: 17/238,186

(22) Filed: Apr. 22, 2021

(51) Int. Cl.
*H04W 68/06* (2009.01)
*H04W 68/02* (2009.01)
*H04W 40/24* (2009.01)
*H04W 68/00* (2009.01)
*G06N 20/00* (2019.01)

(52) U.S. Cl.
CPC ......... *H04W 68/02* (2013.01); *H04W 40/248* (2013.01); *H04W 68/005* (2013.01); *G06N 20/00* (2019.01)

(58) Field of Classification Search
CPC ..... H04W 24/10; H04W 68/06; H04W 68/00; H04W 72/10; H04W 72/1242; H04W 68/04
USPC ........................................................ 370/329
See application file for complete search history.

(56) References Cited

U.S. PATENT DOCUMENTS

| | | | | |
|---|---|---|---|---|
| 6,058,308 A * | 5/2000 | Kallin | .................... | H04W 68/08 455/458 |
| 8,478,293 B2 * | 7/2013 | Zhao | ..................... | H04W 68/04 455/445 |
| 8,838,096 B2 * | 9/2014 | Gogic | ................... | H04W 48/16 455/574 |
| 8,897,819 B2 * | 11/2014 | Arvidsson | ............. | H04W 68/04 455/515 |
| 8,903,432 B2 * | 12/2014 | Yang | ..................... | H04W 68/04 455/435.2 |
| 8,908,598 B1 * | 12/2014 | Oroskar | ................ | H04W 68/02 370/332 |
| 8,996,043 B1 * | 3/2015 | Oroskar | ................ | H04W 68/02 370/312 |
| 9,237,551 B2 * | 1/2016 | Essigmann | ........... | H04W 68/02 |
| 9,936,474 B2 * | 4/2018 | Horn | ..................... | H04W 68/12 |
| 10,342,020 B2 * | 7/2019 | Puddle | ................. | H04W 68/005 |
| 10,856,256 B2 * | 12/2020 | Vaidya | .................. | H04W 68/06 |
| 11,140,600 B2 * | 10/2021 | Kubota | ................. | H04W 74/00 |
| 2019/0320411 A1 * | 10/2019 | Gaigalas | ............. | H04W 68/005 |

(Continued)

*Primary Examiner* — Man U Phan
(74) *Attorney, Agent, or Firm* — Barta, Jones & Foley, PLLC

(57) ABSTRACT

Solutions for focused cellular network paging of a user equipment (UE) include: detecting, by a network, a network exit of the UE from a last known cell and an exit condition for the UE; determining, by the network, a network paging condition; based on at least the last known cell and the exit condition for the UE, determining, by the network, a set of priority paging cells; paging the UE with the set of priority paging cells; and based on at least failing to receive a response by paging the UE with the set of priority paging cells, paging the UE with a larger set of cells. In some examples, the network topology is also used for determining the set of priority paging cells. By starting with the set of priority paging cells, rather than wider global paging, fewer cells are used for paging, thereby saving network bandwidth.

20 Claims, 9 Drawing Sheets

(56) References Cited

U.S. PATENT DOCUMENTS

2022/0174583 A1* 6/2022 Yang .................... H04W 48/16
2022/0225272 A1* 7/2022 Yang .................... H04W 48/18

* cited by examiner

US 11,632,739 B1

FOCUSED CELLULAR NETWORK PAGING

BACKGROUND

Cellular network may use paging to locate a UE, for example by broadcasting an instruction for the UE to respond. When the UE responds, the UE will use a cell, thereby enabling the cellular network to at least locate the UE according to the cell used by the UE. However, since the cellular network does not know the UE's location prior to paging (and receiving the UE's response), the cellular network will perform the paging with a larger set of cells than the cell eventually used by the UE when responding. The larger the number of cells that used for paging, the more paging each cell must perform, on average. Thus, paging with a large set of cell may waste bandwidth, reducing the efficiency of the network.

SUMMARY

The following summary is provided to illustrate examples disclosed herein, but is not meant to limit all examples to any particular configuration or sequence of operations.

Solutions for focused cellular network paging of a user equipment (UE) include: detecting, by a network, a network exit of the UE from a last known cell and an exit condition for the UE; determining, by the network, a network paging condition; based on at least the last known cell and the exit condition for the UE, determining, by the network, a set of priority paging cells; paging the UE with the set of priority paging cells; and based on at least failing to receive a response by paging the UE with the set of priority paging cells, paging the UE with a larger set of cells. In some examples, the network topology is also used for determining the set of priority paging cells. By starting with the set of priority paging cells, rather than wider global paging, fewer cells are used for paging, thereby saving network bandwidth.

BRIEF DESCRIPTION OF THE DRAWINGS

The disclosed examples are described below with reference to the accompanying drawing figures listed below, wherein.

Figure 1:
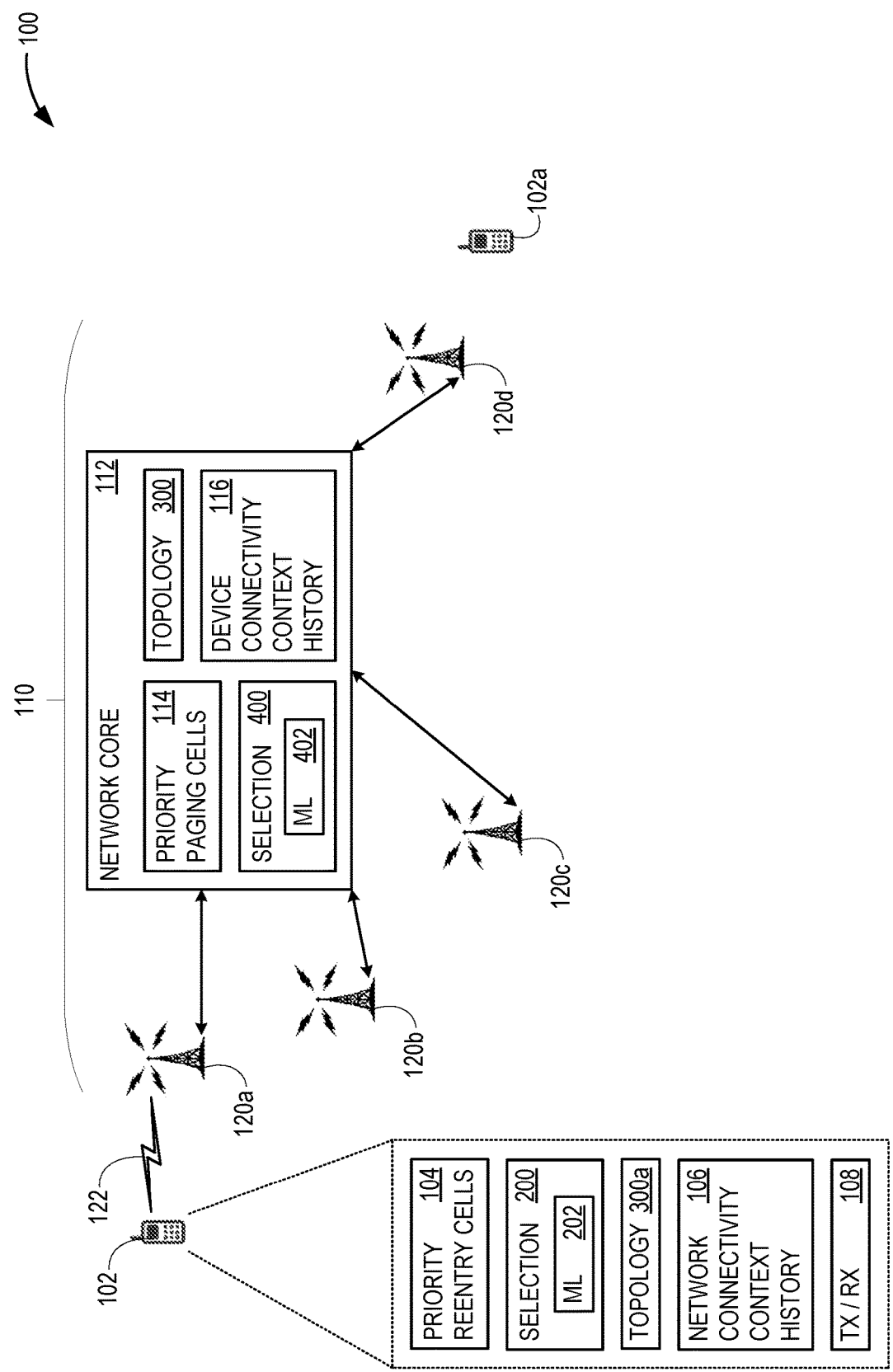
FIG. 1 illustrates an exemplary arrangement that advantageously enables accelerated cell search and selection and/or focused cellular network paging.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for focused cellular network paging of a user equipment (UE) include: detecting, by a network, a network exit of the UE from a last known cell and an exit condition for the UE; determining, by the network, a network paging condition; based on at least the last known cell and the exit condition for the UE, determining, by the network, a set of priority paging cells; paging the UE with the set of priority paging cells; and based on at least failing to receive a response by paging the UE with the set of priority paging cells, paging the UE with a larger set of cells. In some examples, the network topology is also used for determining the set of priority paging cells. By starting with the set of priority paging cells, rather than wider global paging, fewer cells are used for paging, thereby saving network bandwidth.

Aspects of the disclosure improve the operation of cellular communications by introducing hierarchical search techniques for when a cellular network searches for a UE (e.g., by paging the UE). Aspects of the disclosure operate in an unconventional manner by determining a set of priority paging cells and paging the UE with the set of priority paging cells. In some examples, an ML component, such as a neural network (NN), is trained with device connectivity context history so that, after a network exit by a UE, the network is able to quickly locate a cell (or set of cells) that is likely to provide a successful paging result (e.g., the UE is likely to be within range of that cell (or set of cells). This may preclude the need to perform bandwidth-consuming global paging. In some examples, the cells may differ by technology (third generation (3G), fourth generation (4G), fifth generation (5G), or another), band, frequency, cell, site, and area.

FIG. 1 illustrates an exemplary arrangement 100 that advantageously enables accelerated cell search and selection and/or focused cellular network paging. In arrangement 100, a UE 102 had earlier exited a network 110 and either UE 102 will be attempting to reenter network 110, or network 110 will be attempting to page UE 102. Network 110 includes a network core 112 and a plurality of cells 120*a*-120*d*, each of which is illustrated as a cell site. It should be understood that a particular cell cite may support multiple cells, such as both 5G and 4G cells, and even multiple cells with the same technology (e.g., 4G versus 5G) but different frequencies. UE 102 is in proximity of cell 120*a* and will be able to communicate with cell 120*a* over an air interface 122. Cell 120*b* is a neighbor cell, which is also within the range of a transceiver 108 of UE 102, but may provide a less-preferable connectivity option, due to a higher path loss over a longer range. Cells 120*c* and 120*d* are out of the range of transceiver 108 of UE 102. Another UE 102*a* is shown in proximity of cell 120*d*.

If UE 102 were to perform a blind cell search, the cell search may waste time and battery power relative to UE 102 attempting network reentry (to network 110) specifically with one or both of cells 120*a* or 120*b*. This is because, due to the location of UE 102 in proximity of cell 120*a*, and also within range of cell 120*b*, if one of cells 120*a* and 120*b* has capacity to register UE 102, network reentry may be more rapid and require fewer transmissions.

With the disclosed accelerated cell search and selection, cells 120*a* and 120*b* will be identified in a set of priority reentry cells 104 in UE 102. Set of priority reentry cells 104 predicts and prioritizes the set of cells with which UE 102 will attempt registration (for network reentry) ahead of performing a blind search. Set of priority reentry cells 104 is determined by a selection logic 200 that includes an ML component 202. Selection logic 200 and ML component 202 are described in further detail in relation to FIG. 2. In some examples, selection logic 200 uses a network connectivity context history 106, which is also described in further detail in relation to FIG. 2. In some examples, selection logic 200 uses a network topology 300*a*, which is described in further detail in relation to FIGS. 2 and 3.

Similarly, if network 110 were to perform global paging of UE 102 using all of base stations 102*a*-102*d*, the paging may waste network bandwidth relative to network 110 paging UE 102 with only cells 120*a* and 120*b*. This is because, due to the location of UE 102 in proximity of cell 120*a*, and also within range of cell 120*b*, UE 102 will not detect pages from either of cells 120*c* or 120*d*. Thus, cells 120*c* and 120*d* paging UE 102 is a waste of bandwidth.

With the disclosed focused cellular network paging, cells 120*a* and 120*b* will be identified in a set of priority paging cells 114 in network core 112. Set of priority paging cells 114 provides the set of cells with which network 110 will attempt paging UE 102 ahead of performing global paging. Set of priority paging cells 114 is determined by a selection logic 400 that includes an ML component 402. Selection logic 400 and ML component 402 are described in further detail in relation to FIG. 4. In some examples, selection logic 400 uses a device connectivity context history 116, which is also described in further detail in relation to FIG. 4. In some examples, selection logic 400 uses a network topology 300, which is described in further detail in relation to FIGS. 2 and 4.

Similarly with network 110 paging UE 102 with cells 120*a* and 120*b* ahead of performing global paging, if network 110 encountered a network paging condition (e.g., a reason to page) for UE 102*a*, set of priority paging cells 114 would indicate cell 120*d*, limiting the number of cells that performed paging. In both scenarios, paging UE 102 and paging UE 102*a*, cell 120*c* is not included in the focused paging. If however, one of UE 102 or UE 102*a* failed to respond to paging, such as selection logic 400 determined an incorrect set of priority paging cells 114, or UE 102 or 102*a* were shut down, network 110 may then attempt paging with a larger set of cells that may include cell 120*c*.

Figure 2:
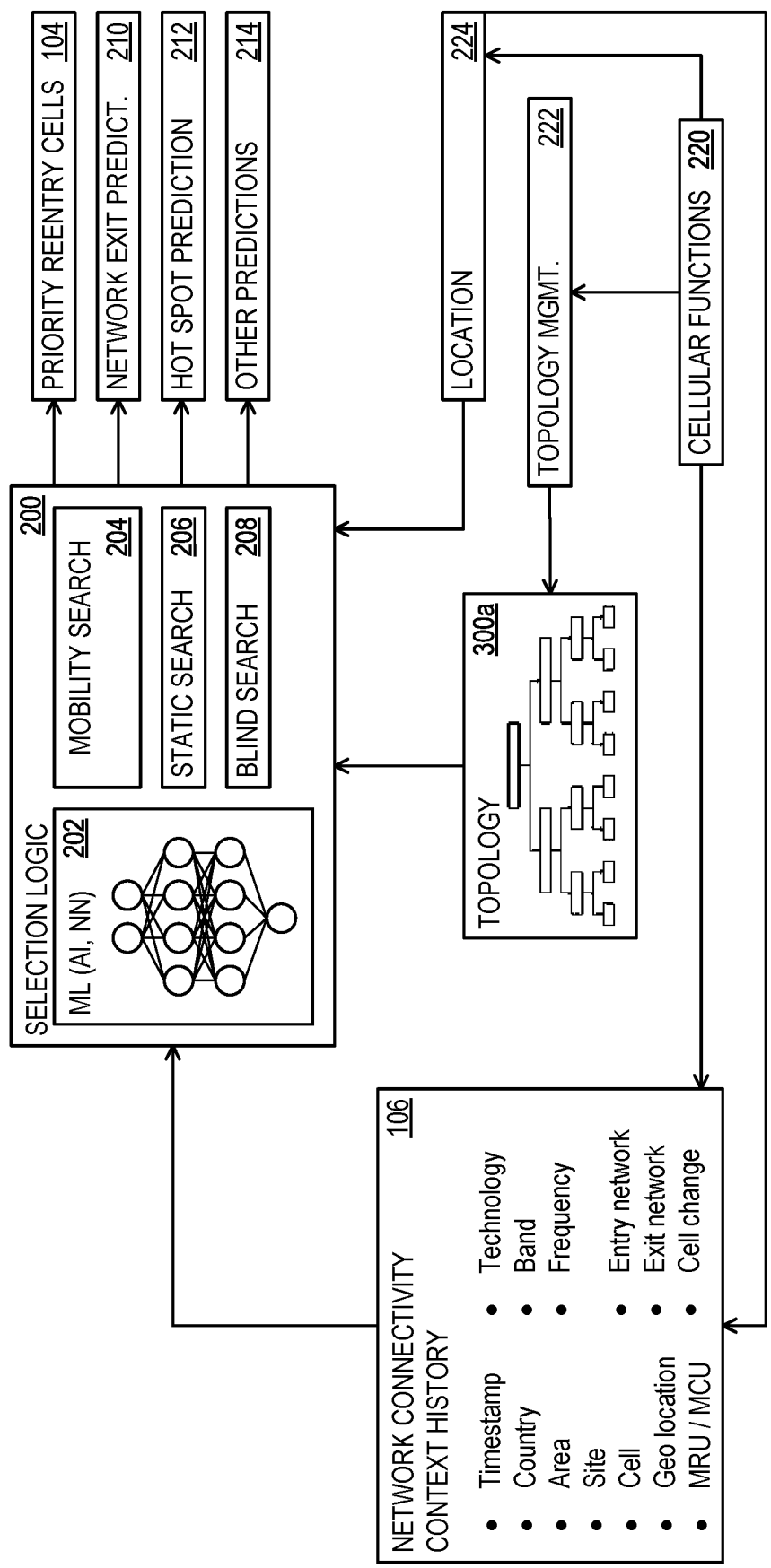
FIG. 2 illustrates components employed by a user equipment used by a user equipment (UE) for accelerated cell search and selection in the arrangement of FIG. 1.

FIG. 2 illustrates components employed by UE 102 for accelerated cell search and selection, and which may be stored or execute on UE 102. Network connectivity context history 106 is a data store of information related to cell connections, and is used to train ML component 202. Network connectivity context history 106 may include information such as timestamps of cell connections, handoffs, and coverage losses; network area identification information such as country, area, site, and cell; geographic location (e.g., derived from GPS coordinates of UE 102 or taking on the location of a connected cell as an approximation of the location of UE 102); and MRU cell and/or most commonly used (MCU) cell. Network connectivity context history 106 may also include information specific to certain cells with which UE 102 has been connected, such as technology (e.g., 3G, 4G, or 5G), band, and frequency and network entry/exit information such as identification of entry networks, exit networks, and cell changes.

Network connectivity context history 106 is collected by cellular functions 220 of UE 102, which include transceiver 108, as UE 102 moves around within the coverage of network 110. Network connectivity context history 106 is provided to selection logic 200 in order to produce set of priority reentry cells 104 (predicted and prioritized) and, in some examples, other data products. In some examples, these other data products include one or more of a network exit prediction 210 (which may predict an impending coverage loss, based on a location 224 of UE 102), a hot spot prediction 212, and other predictions 214 relevant to improving user experience. For example, if UE 102 has a history of losing cell connectivity when traveling along a certain route (e.g., due to poor coverage in that area), selection logic 200 may generate network exit prediction 210 which acts as an alert to the user of UE 102. This permits the user to take preemptive remedial action, improving user experience.

In some examples, a topology 300*a* is also provided to selection logic 200, in order to facilitate location of neighboring cells in some area where cell information is not available in network connectivity context history 106. Topology 300*a* is a portion of topology 300 of FIG. 3. Whereas topology 300 may comprise topology information for the entirety (or nearly so) of network 110, topology 300*a* may comprise only the portion of network 110 that is in the vicinity of UE 102. This minimizes the size of topology 300*a* in the memory of UE 102, as well as the bandwidth used when network 110 transmits topology 300*a* to UE 102.

In operation, when UE 102 moves to a new network, or an area of a network (e.g., network 110) for which UE 102 does not have historically-derived information (in network connectivity context history 106) the network may transmit a portion of topology 300 to UE 102 as topology 300*a*. UE 102 receives topology 300*a* from network 110 through cellular functions 220. As UE 102 moves around in the new area of network 110, cellular functions 220 provides cell information to update both network connectivity context history 106 and also topology 300*a* (via a topology management component 222). In this manner, in some examples, UE 102 is able to build out its own topology information in topology 300*a* as it discovers cells in network 110.

ML component 202 may include artificial intelligence (AI) functionality, such as an NN, or other AI/ML logic. In some examples, an NN of ML component 202 has multiple layers, such as for determining priority reentry cells based on last known location, last known cell, or last known context. In some examples, the NN is able to determine priority reentry cells based on the MRU cell and/or neighbors of the MRU cell. Selection logic 200 is illustrated has having a mobility search logic 204, a static search logic 206, and a blind search logic 208. Mobility search logic 204 may be used, for example, when UE 102 has moved sufficiently, after a network exit and prior to a network reentry attempt, that UE 102 is unlikely to be able to register with the MRU cell. Static search logic 206 may be used, for example, when UE 102 has not moved significantly, after a network exit and prior to a network reentry attempt, so that UE 102 is likely to be able to register with the MRU cell and/or a neighbor of the MRU cell. Blind search logic 208 is used for a traditional blind cell search when registration attempts using set of priority reentry cells 104 fail.

Figure 3:
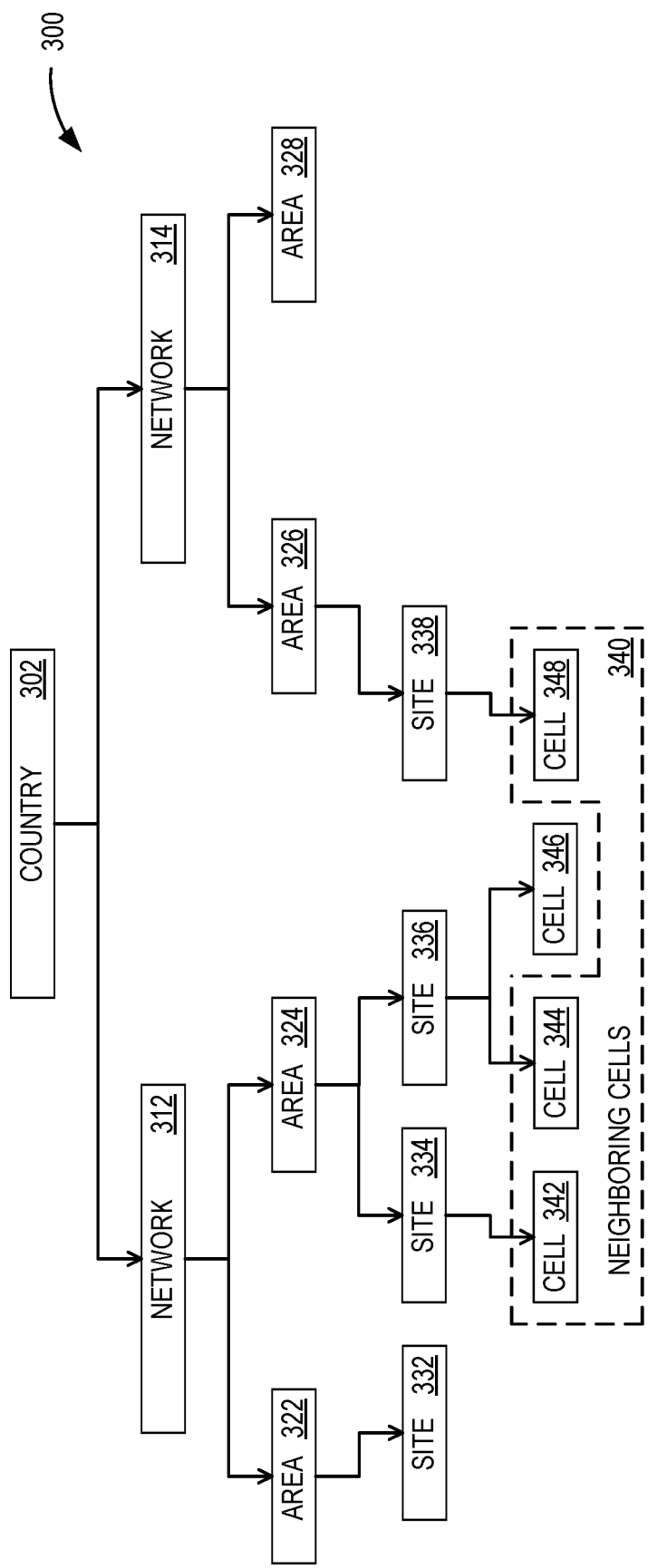
FIG. 3 illustrates a network topology, which is represented in FIGS. 2 and 4.

FIG. 3 illustrates network topology 300 in further detail. Topology 300 has a base level indexed by a country identification 302, and then divided into network identifications 312 and 314. For example, network identification 312 may identify network 110, whereas network identification 314 identifies a network of a different cellular carrier. Each network identifies regions or areas, with area identification 322 and area identification 324 for network identification 312, and area identification 326 and area identification 328 for network identification 314. It should be understood that a larger number of network identification and area identifications may be used.

An area in a network may have multiple cell sites, and each cell site may have multiple cells. As illustrated, area identification 322 has a site 332, area identification 324 has a site 334 and a site 336, and area identification 326 has a site 338. Site 334 is illustrated as having a cell 342; site 336 is illustrated as having two cells (cell 344 and cell 346); and site 336 is illustrated as having a cell 348. It should be understood that a larger number of sites and cells may be used. If UE 102 is using cell 348, and sites 334 and 338 are sufficiently close, cells 342, 344, and 348 make up neighboring cells 340. In some examples, area identification 324 corresponds with a tracking area, in which network 110 will attempt to page UE 102, if needed. That is set of priority paging cells 114 may be at least somewhat correlated with cells under area identification 324 in topology 300.

Figure 4:
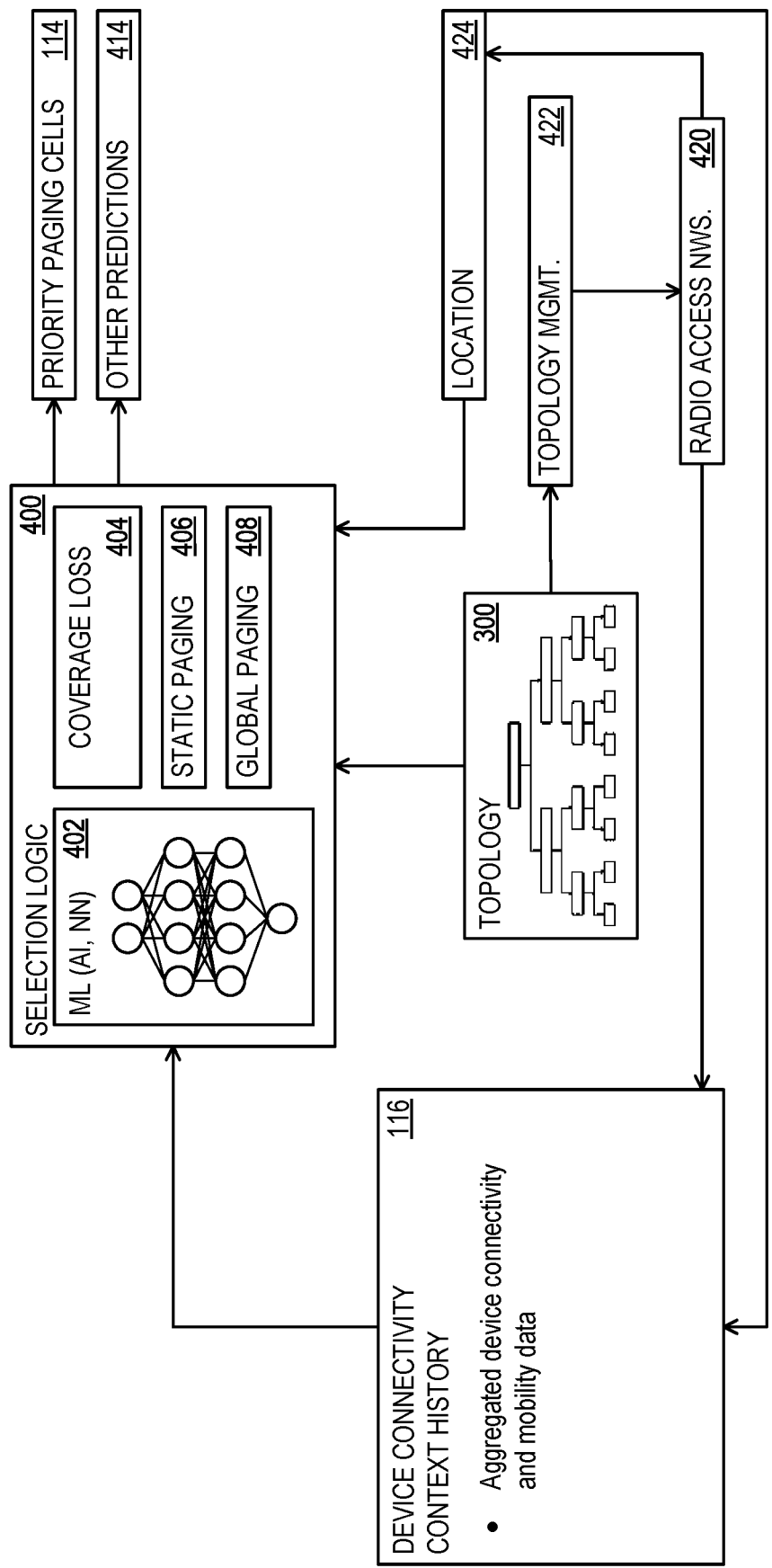
FIG. 4 illustrates components employed by a network core for focused cellular network paging in the arrangement of FIG. 1.

FIG. 4 illustrates components employed by network core 112 for focused cellular network paging in arrangement 100 of FIG. 1, and which may be stored or execute on network core 112. Device connectivity context history 116 is a data store of information related to aggregated UE network entry and exit events, and is used to train ML component 402. Device connectivity context history 116 may include information such as timestamps of network entry and exit events, and exit reasons, such as failure to respond by a UE (e.g. a presumed coverage loss) or a controlled exit (e.g., intentional UE power-down or activation of airplane mode that turns off the UE's cellular transceiver).

Device connectivity context history 116 is collected by radio access networks 420, which include cells of network 110 (e.g., cells 120a-120d). Device connectivity context history 116 is provided to selection logic 400 in order to produce set of priority paging cells 114 and, in some examples, other predictions 414 relevant to improving efficiency, reliability, speed, or other operational aspects of network 110. For example, if a large number of UEs has a history of losing cell connectivity when traveling along a certain route (e.g., due to poor coverage in that area), selection logic 400 may generate a prediction that UEs exiting network 110 at a first cell will reappear at a second cell. Such a prediction may be useful for producing a map of locations to prioritize improving coverage (e.g., by suggesting installation of a new cell between the first cell and the second cell). Location information 424 may be provided by radio access networks 420. In some examples, topology 300 is also provided to selection logic 400, in order to facilitate identification of neighboring cells in a tracking area where a UE is likely to receive paging. A topology management component 422 extracts a relevant portion of topology 300 to provide to UE 102 as topology 300a (via radio access networks 420), when needed by UE 102.

ML component 402 may include AI functionality, such as an NN, or other AI/ML logic. In some examples, an NN of ML component 402 has multiple layers, such as for determining priority paging cells based on last known location, last known cell, or last known context. In some examples, the NN is able to determine priority paging cells based on the MRU cell and/or neighbors of the MRU cell. Selection logic 400 is illustrated has having a coverage loss paging logic 404, a static paging logic 406, and a global paging logic 408. Coverage loss paging logic 404 may be used, for example, when UE 102 fails to respond, and network 110 is unable to determine a reason for the failure to respond. In such scenarios, it is possible that UE 102, after a network exit and prior to a paging attempt, that has moved sufficiently that UE 102 is unlikely to respond to a page from the MRU cell. Static paging logic 406 may be used, for example, when UE 102 has performed a controlled exit, and so may have remained in place until the user powers UE 102 up again. Global paging logic 408 is used for a traditional global paging when paging attempts using set of priority paging cells 114 fail.

Figure 5:
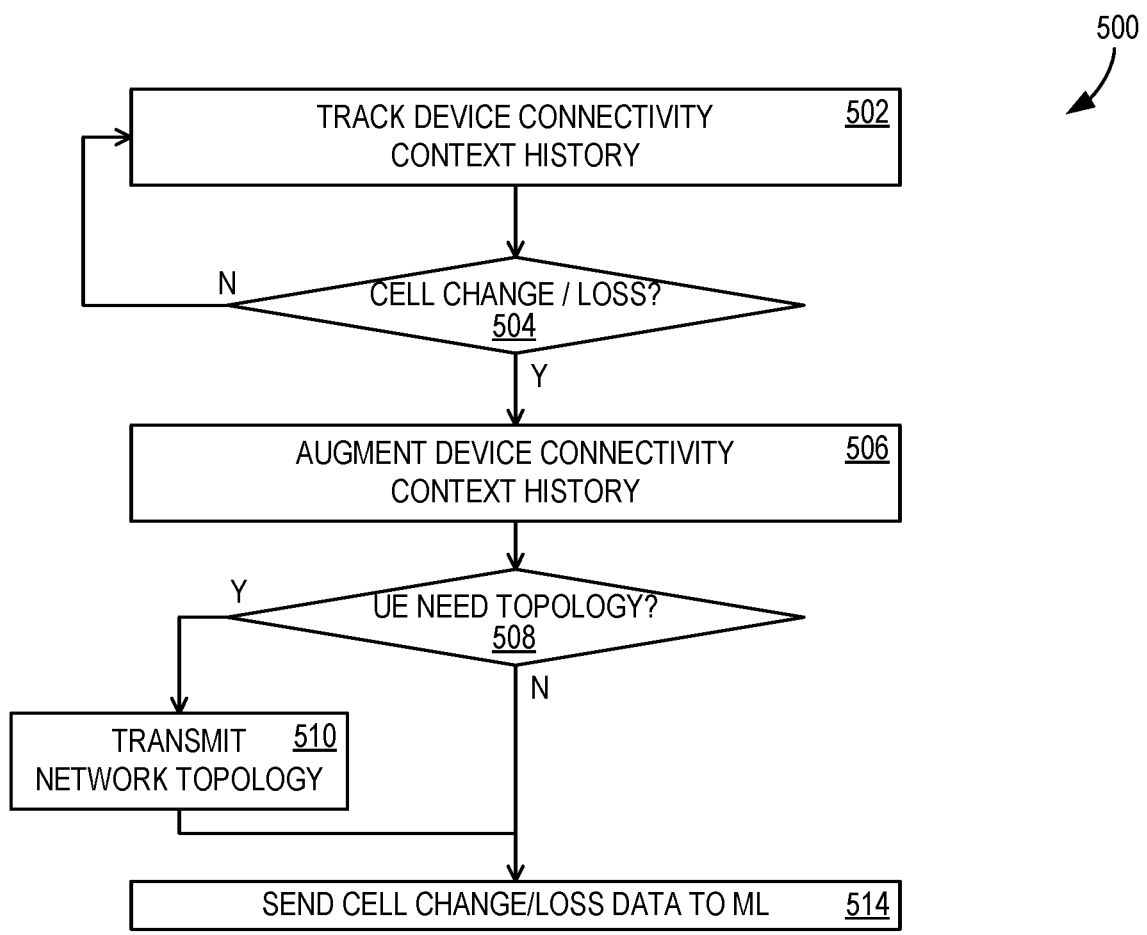
FIG. 5 illustrates a flowchart of exemplary operations that may be associated with focused cellular network paging in examples of the arrangement of FIG. 1.
Figure 6:
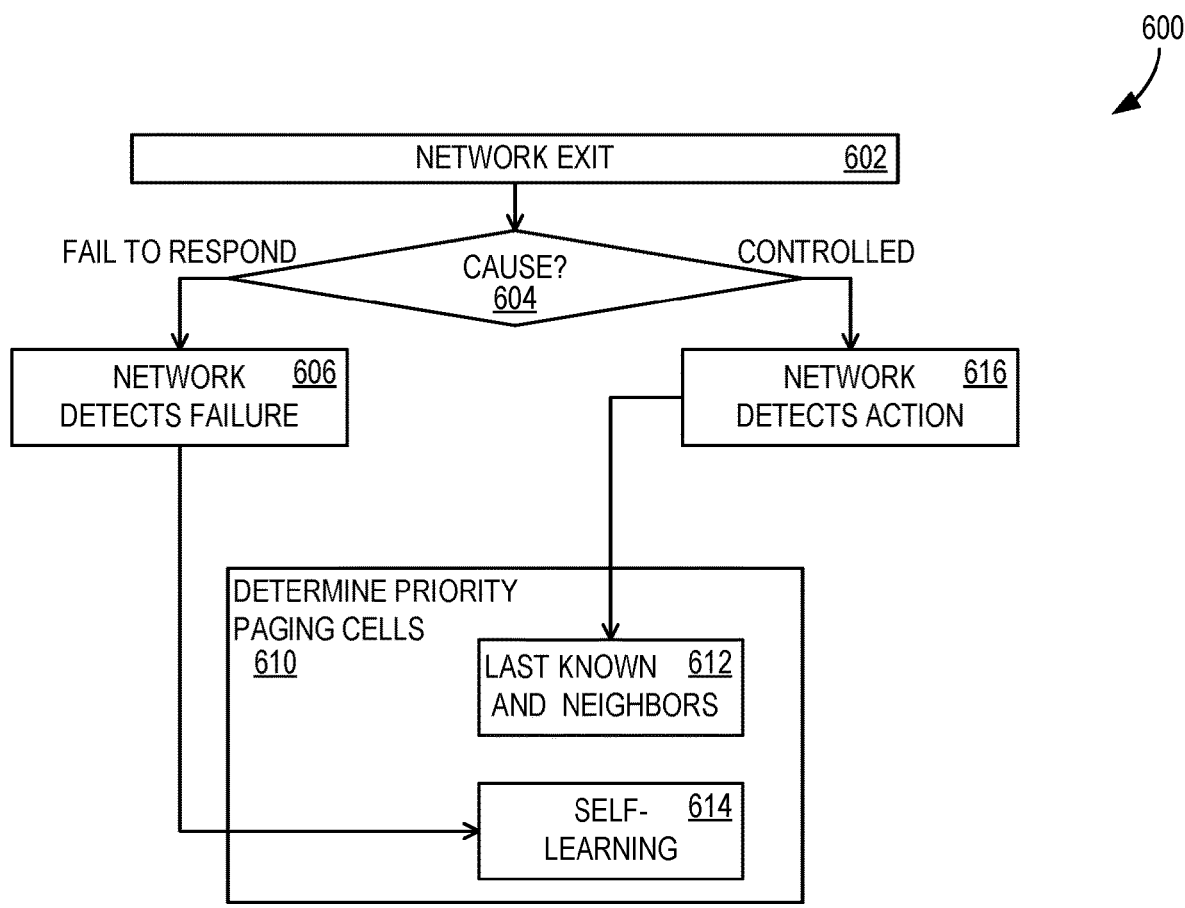
FIG. 6 illustrates another flowchart of exemplary operations that may be associated with focused cellular network paging in examples of the arrangement of FIG. 1.
Figure 7:
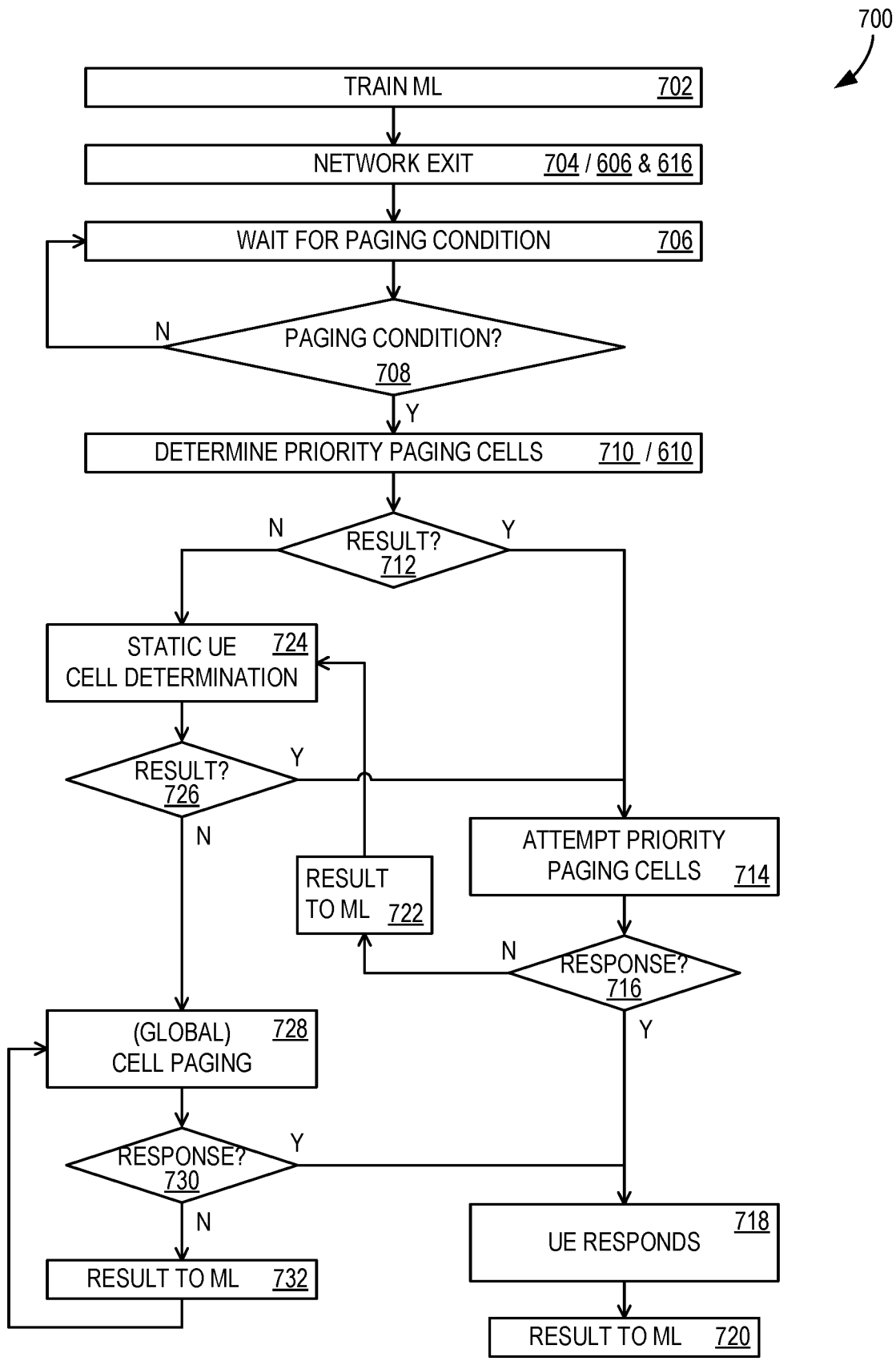
FIG. 7 illustrates another flowchart of exemplary operations that may be associated with focused cellular network paging in examples of the arrangement of FIG. 1.

FIGS. 5, 6, and 7 illustrate flowcharts 500, 600, and 700, respectively, of exemplary operations associated with focused cellular network paging in examples of arrangement 100 of FIG. 1. The operations of flowcharts 500, 600, and 700 are performed together, to accomplish focused cellular network paging. In some examples, at least a portion of each of flowcharts 500, 600, and 700 may be performed using one or more computing devices 900 of FIG. 9. Referring first to FIG. 5, operation 502 includes tracking and storing device connectivity context history 116.

Decision operation 504 determines whether there is a network exit of UE 102 from a last known cell and an exit condition for UE 102. If so, operation 506 augments device connectivity context history 116 with a UE cell change or a UE coverage loss. Decision operation 508 determines whether UE 102 needs at least a portion of topology 300 as a result of UE 102 entering a new area of network 110 (e.g., by UE requesting topology information). If so, operation 510 includes, based on at least a cell change by UE 102, transmitting to UE 102 at least a portion of the network topology 300 (e.g., topology 300a). In operation 514, cell change or coverage loss information is sent to ML component 402 to further train ML component 402.

In FIG. 6, UE 102 exits network 110 at 602, which may be a failure to respond or a controlled exit, as indicated by 604. If the network exit comprises a failure to respond or other unknown reason, network 110 detects the failure to respond at 606. If the network exit comprises a controlled exit of which UE 102 informs network 110, network 110 detects the controlled exit action at 616. Together, operations 606 and 616 include detecting, by network 110, a network exit of UE 102 from a last known cell and an exit condition for UE 102 (which also corresponds with operation 704 of flowchart 700).

Set of priority paging cells 114 is determined at 610, which may include either operation 612 or 614. Operation 612 includes, based on at least the exit condition comprising a controlled exit, determining set of priority paging cells 114 comprises determining set of priority paging cells 114 based on at least the last known cell. Operation 614 includes, based on at least the exit condition comprising a failure to respond, determining set of priority paging cells 114 comprises determining the set of priority paging cells by ML component 402. Operation 610 corresponds with operation 710 of flowchart 700 (FIG. 7).

In FIG. 7, operation 702 includes training ML component 402, both pre-deployment training, and ongoing training with device connectivity context history 116. Operation 704 includes detecting, by network 110, a network exit of UE 102 from a last known cell and an exit condition for UE 102. Operation 706 includes waiting for a network paging condition, and decision operation 708 determines a network paging condition has occurred. When a network paging condition occurs, operation 710 includes, based on at least the last known cell and the exit condition for UE 102, determining, by network 110, set of priority paging cells 114. Operation 710 corresponds with operation 610 of flowchart 600 (FIG. 6). In some examples, set of priority paging cells 114 identifies at least one cell feature selected from the list consisting of: a cellular network technology, a cellular band, and a frequency. In some examples, set of priority paging cells 114 comprises a single cell.

Decision operation 712 determines whether ML component 402 is able to produce set of priority paging cells 114, or instead whether ML component 402 lacks sufficient input data to provide meaningful results. If ML component 402 is able to produce set of priority paging cells 114, operation 714 includes paging UE 102 with set of priority paging cells 114. Decision operation 716 determines whether the paging of operation 714 is successful, based on whether a response is received from UE 102. If operation 714 is successful, UE 102 will respond as operation 618. This success is saved to device connectivity context history 116, and used to further train ML component 402. Thus, operation 720 includes learning, by ML component 402, a paging result, and/or augmenting device connectivity context history 116 with a paging result. If, however, operation 714 fails (e.g., results fails to receive a response from UE), the result is also saved to device connectivity context history 116, and used to further train ML component 402 at 722. Thus, operation 722 also includes learning, by ML component 402, a paging result, and/or augmenting device connectivity context history 116 with a paging result.

Selection logic 400 (of FIG. 4) may then turn to a static UE cell determination (e.g., using a last known cell or neighbor as described for operation 612 of FIG. 6. This uses static paging logic 406, at 724. Flowchart 700 may also reach operation 724 earlier, as a result of decision operation 712 determining that ML component 402 is unable to produce set of priority paging cells 114. Operation 724 includes, based on at least the last known cell and the exit condition for UE 102 not providing a successful set of priority paging cells 114, determining, by network 110, set of priority paging cells 114 based on at least network topology 300. Decision operation 726 determines whether operation 724 is able to successfully produce set of priority paging cells 114, or instead whether operation 724 lacks sufficient input data (e.g., location of UE 102) to provide meaningful results.

If operation 724 is successful, and produces a result, flowchart 700 returns to operation 714 to attempt paging with the new set of priority paging cells 114. Otherwise, traditional paging (e.g., global paging) may be attempted at 728. Operation 728 includes, based on at least failing to receive a response by paging UE 102 with set of priority paging cells 114, paging UE 102 with a larger set of cells. Decision operation 730 determines whether operation 728 is successful. If so, flowchart moves to operation 718, as described above. Otherwise, this failure is recorded in device connectivity context history 116, and used to further train ML component 402 at 732. Thus, operation 732 also includes learning, by ML component 402, a paging result, and/or augmenting device connectivity context history 116 with a paging result. Flowchart 700 then returns to operation 728 for additional global paging until UE 102 responds (or a time-out occurs to halt paging).

Figure 8:
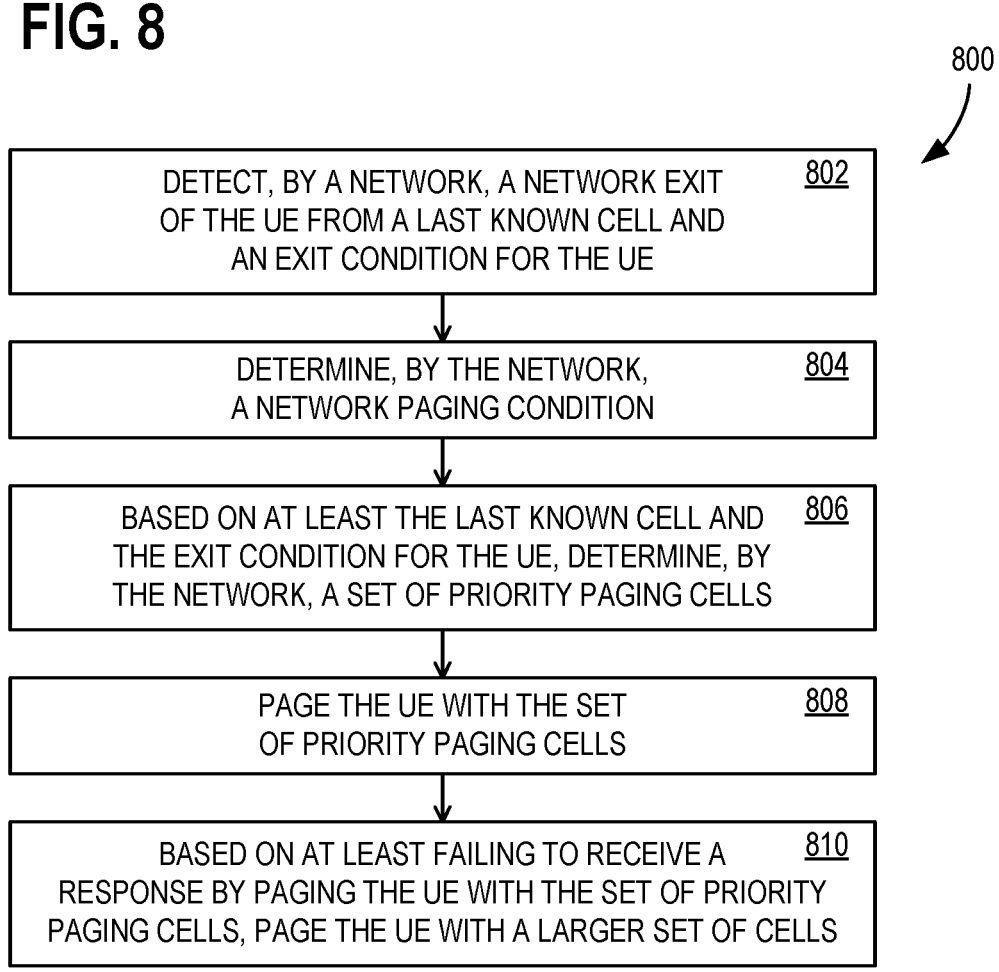
FIG. 8 illustrates another flowchart of exemplary operations that may be associated with focused cellular network paging in examples of the arrangement of FIG. 1.

FIG. 8 illustrates a flowchart 800 of exemplary operations associated with focused cellular network paging in examples of arrangement 100 of FIG. 1. In some examples, at least a portion of flowchart 800 may be performed using one or more computing devices 900 of FIG. 9. Operation 802 includes detecting, by a network, a network exit of the UE from a last known cell and an exit condition for the UE. Operation 804 includes determining, by the network, a network paging condition. Operation 806 includes, based on at least the last known cell and the exit condition for the UE, determining, by the network, a set of priority paging cells. Operation 808 includes paging the UE with the set of priority paging cells. Operation 810 includes, based on at least failing to receive a response by paging the UE with the set of priority paging cells, paging the UE with a larger set of cells.

Figure 9:
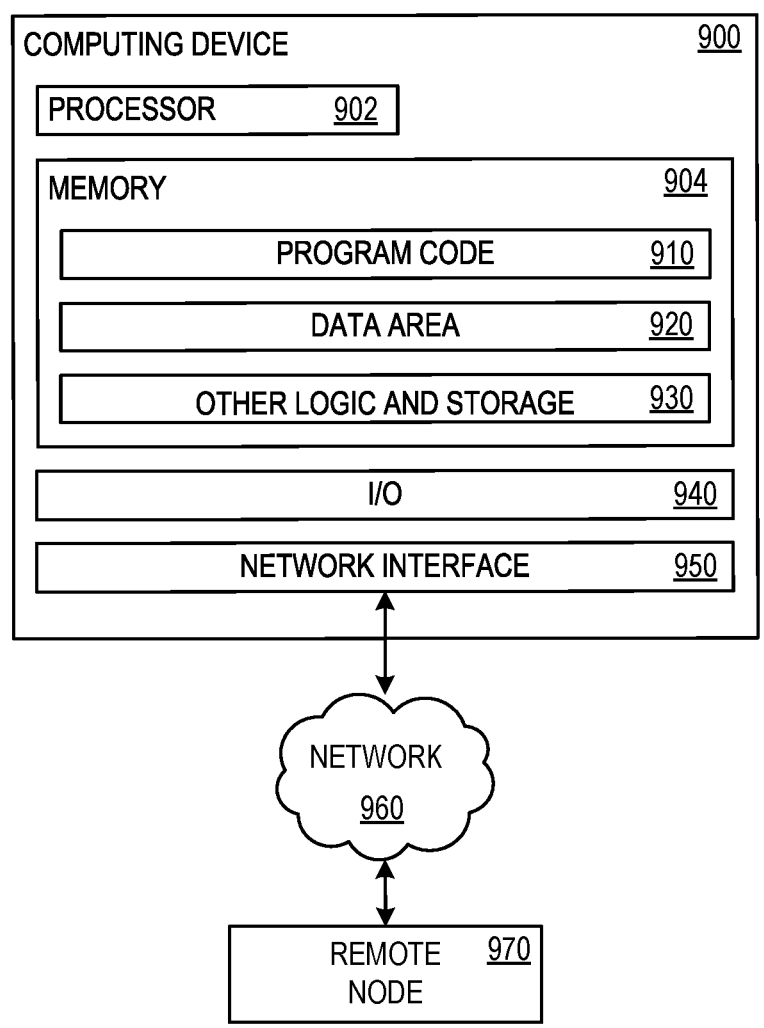
FIG. 9 illustrates a block diagram of a computing device suitable for implementing various aspects of the disclosure.

FIG. 9 illustrates a block diagram of computing device 900 that may be used as a component of arrangement 100, for example, as any component described herein that may require computational or storage capacity. Computing device 900 has at least a processor 902 and a memory 904 that holds program code 910, data area 920, and other logic and storage 930. Memory 904 is any device allowing information, such as computer executable instructions and/or other data, to be stored and retrieved. For example, memory 904 may include one or more random access memory (RAM) modules, flash memory modules, hard disks, solid-state disks, persistent memory devices, and/or optical disks. Program code 910 comprises computer executable instructions and computer executable components including any instructions necessary to perform operations described herein. Data area 920 holds any data necessary to perform operations described herein. Memory 904 also includes other logic and storage 930 that performs or facilitates other functions disclosed herein or otherwise required of computing device 900. An input/output (I/O) component 940 facilitates receiving input from users and other devices and generating displays for users and outputs for other devices. A network interface 950 permits communication over a network 960 with a remote node 970, which may represent another implementation of computing device 900.

Additional Examples

An example method of cellular network paging of a UE comprises: detecting, by a network, a network exit of the UE from a last known cell and an exit condition for the UE; determining, by the network, a network paging condition; based on at least the last known cell and the exit condition for the UE, determining, by the network, a set of priority paging cells; paging the UE with the set of priority paging cells; and based on at least failing to receive a response by paging the UE with the set of priority paging cells, paging the UE with a larger set of cells.

An example system for cellular network paging of a UE comprises: a processor; and a computer-readable medium storing instructions that are operative upon execution by the processor to: detect, by a network, a network exit of the UE from a last known cell and an exit condition for the UE; determine, by the network, a network paging condition; based on at least the last known cell and the exit condition for the UE, determine, by the network, a set of priority paging cells; page the UE with the set of priority paging cells; and based on at least failing to receive a response by paging the UE with the set of priority paging cells, page the UE with a larger set of cells.

One or more example computer storage devices has computer-executable instructions stored thereon, which, upon execution by a computer, cause the computer to perform operations comprising: detecting, by a network, a network exit of a UE from a last known cell and an exit condition for the UE; determining, by the network, a network paging condition; based on at least the last known cell and the exit condition for the UE, determining, by the network, a set of priority paging cells; paging the UE with the set of priority paging cells; and based on at least failing to receive a response by paging the UE with the set of priority paging cells, paging the UE with a larger set of cells.

Alternatively, or in addition to the other examples described herein, examples include any combination of the following:

- based on at least the last known cell and the exit condition for the UE not providing a successful set of priority paging cells, determining, by the network, the set of priority paging cells based on at least a network topology;
- the set of priority paging cells identifies at least one cell feature selected from the list consisting of: a cellular network technology, a cellular band, and a frequency;
- based on at least a cell change by the UE, transmitting to the UE at least a portion of the network topology;
- based on at least the exit condition comprising a controlled exit, determining the set of priority paging cells comprises determining the set of priority paging cells based on at least the last known cell;
- based on at least the exit condition comprising a failure to respond, determining the set of priority paging cells comprises determining the set of priority paging cells by an ML component;
- learning, by the ML component, a paging result;
- the set of priority paging cells comprises a single cell;
- augmenting a device connectivity context history with a UE cell change or a UE coverage loss or a paging result;
- the network comprises a 4G cellular network; and
- the network comprises a 5G cellular network.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of cellular network paging of a user equipment (UE), the method comprising:
   - detecting, by a network, a network exit of the UE from a last known cell and an exit condition for the UE;
   - determining, by the network, a network paging condition;
   - based on at least the last known cell and the exit condition for the UE not providing a successful set of priority paging cells, determining, by the network, a set of priority paging cells based on a network topology;
   - paging the UE with the set of priority paging cells; and
   - based on at least failing to receive a response by paging the UE with the set of priority paging cells, paging the UE with a larger set of cells.

2. The method of claim 1, wherein the set of priority paging cells comprises a single cell.

3. The method of claim 1, further comprising:
   - based on at least a cell change by the UE, transmitting to the UE at least a portion of the network topology.

4. The method of claim 3, wherein the set of priority paging cells identifies at least one cell feature selected from the list consisting of:
   - a cellular network technology, a cellular band, and a frequency.

5. The method of claim 1, further comprising:
   - based on at least the exit condition comprising a controlled exit, determining the set of priority paging cells comprises determining the set of priority paging cells based on at least the last known cell.

6. The method of claim 1, further comprising:
   - based on at least the exit condition comprising a failure to respond, determining the set of priority paging cells comprises determining the set of priority paging cells by a machine learning (ML) component.

7. The method of claim 6, further comprising:
   - learning, by the ML component, a paging result.

8. A system for cellular network paging of a user equipment (UE), the system comprising:
   - a processor; and
   - a computer-readable medium storing instructions that are operative upon execution by the processor to:
     - detect, by a network, a network exit of the UE from a last known cell and an exit condition for the UE;
     - determine, by the network, a network paging condition;
     - based on at least the last known cell and the exit condition for the UE not providing a successful set of priority paging cells, determine, by the network, a set of priority paging cells based on a network topology;
     - page the UE with the set of priority paging cells; and
     - based on at least failing to receive a response by paging the UE with the set of priority paging cells, page the UE with a larger set of cells.

9. The system of claim 8, wherein the operations are further operative to:
   - based on at least a cell change by the UE, transmit to the UE at least a portion of the network topology.

10. The system of claim 8, wherein the set of priority paging cells identifies at least one cell feature selected from the list consisting of:
    - a cellular network technology, a cellular band, and a frequency.

11. The system of claim 8, wherein the operations are further operative to:
    - based on at least the exit condition comprising a controlled exit, determine the set of priority paging cells comprises determining the set of priority paging cells based on at least the last known cell.

12. The system of claim 8, wherein the operations are further operative to:

based on at least the exit condition comprising a failure to respond, determine the set of priority paging cells comprises determining the set of priority paging cells by a machine learning (ML) component.

13. The system of claim 8, wherein the set of priority paging cells comprises a single cell.

14. One or more computer storage devices having computer-executable instructions stored thereon, which, upon execution by a computer, cause the computer to perform operations comprising:
   detecting, by a network, a network exit of a user equipment (UE) from a last known cell and an exit condition for the UE;
   determining, by the network, a network paging condition;
   based on at least the last known cell and the exit condition for the UE not providing a successful set of priority paging cells, determining, by the network, a set of priority paging cells based on a network topology;
   paging the UE with the set of priority paging cells; and
   based on at least failing to receive a response by paging the UE with the set of priority paging cells, paging the UE with a larger set of cells.

15. The one or more computer storage devices of claim 14, wherein the operations further comprise:
   based on at least a cell change by the UE, transmitting to the UE at least a portion of the network topology.

16. The one or more computer storage devices of claim 14, wherein the set of priority paging cells identifies at least one cell feature selected from the list consisting of:
   a cellular network technology, a cellular band, and a frequency.

17. The one or more computer storage devices of claim 14, wherein the operations further comprise:
   based on at least the exit condition comprising a controlled exit, determining the set of priority paging cells comprises determining the set of priority paging cells based on at least the last known cell.

18. The one or more computer storage devices of claim 14, wherein the operations further comprise:
   based on at least the exit condition comprising a failure to respond, determining the set of priority paging cells comprises determining the set of priority paging cells by a machine learning (ML) component.

19. The one or more computer storage devices of claim 18, further comprising:
   learning, by the ML component, a paging result.

20. The one or more computer storage devices of claim 14, wherein the set of priority paging cells comprises a single cell.

\* \* \* \* \*